June 25, 1957  C. W. VAN RANST  2,796,853
AIR INLET ARRANGEMENT FOR COMBUSTION ENGINES
Filed Aug. 26, 1955  3 Sheets-Sheet 1
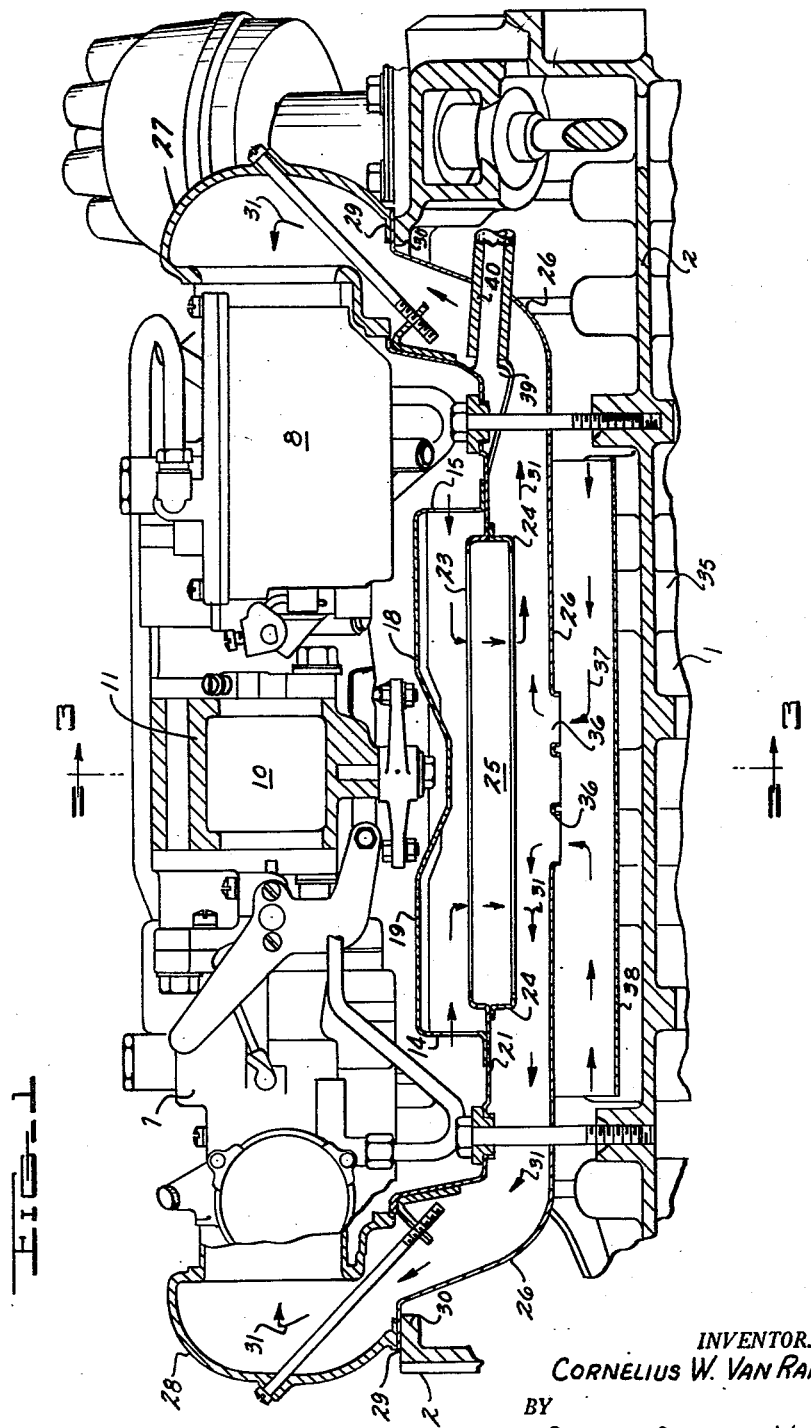
INVENTOR.
CORNELIUS W. VAN RANST
BY
SMITH, OLSEN & KOTTS
ATTORNEYS

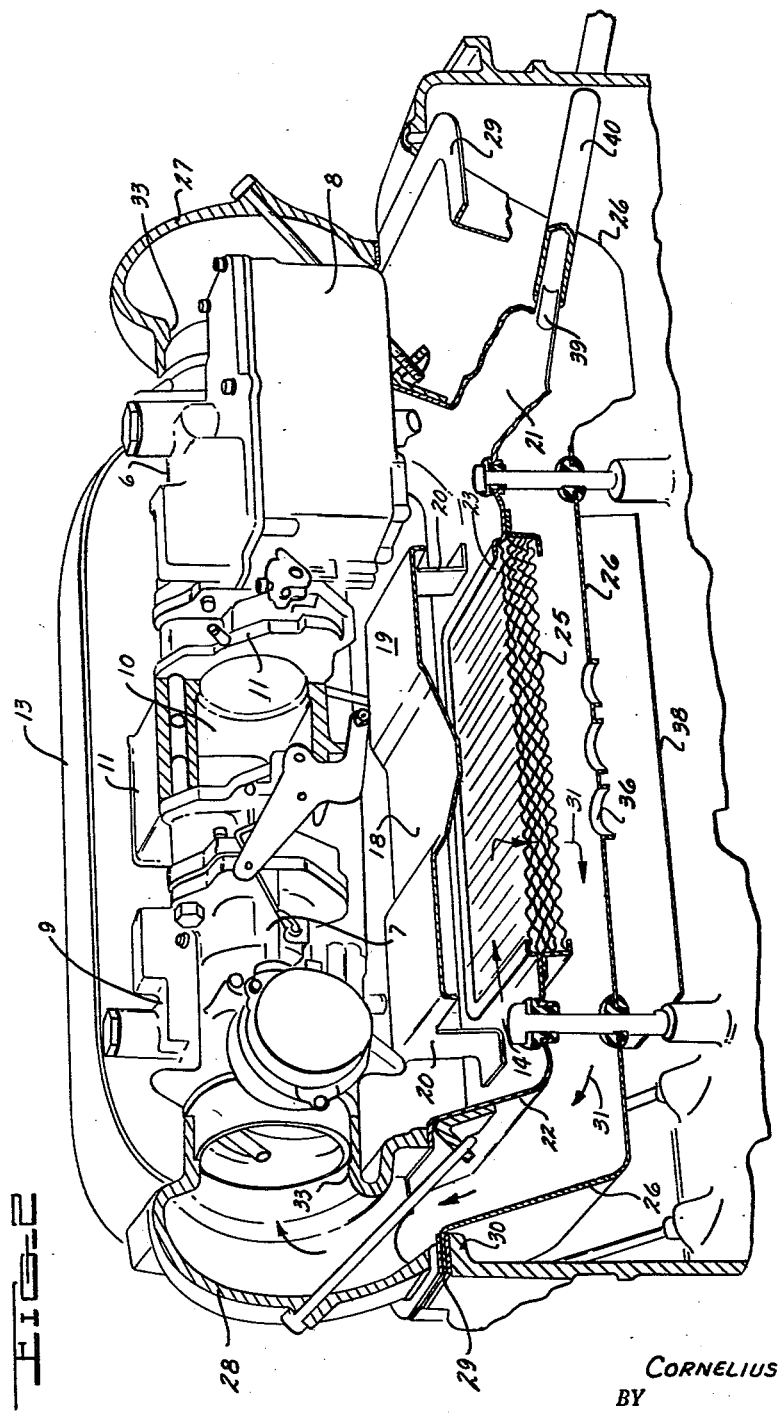

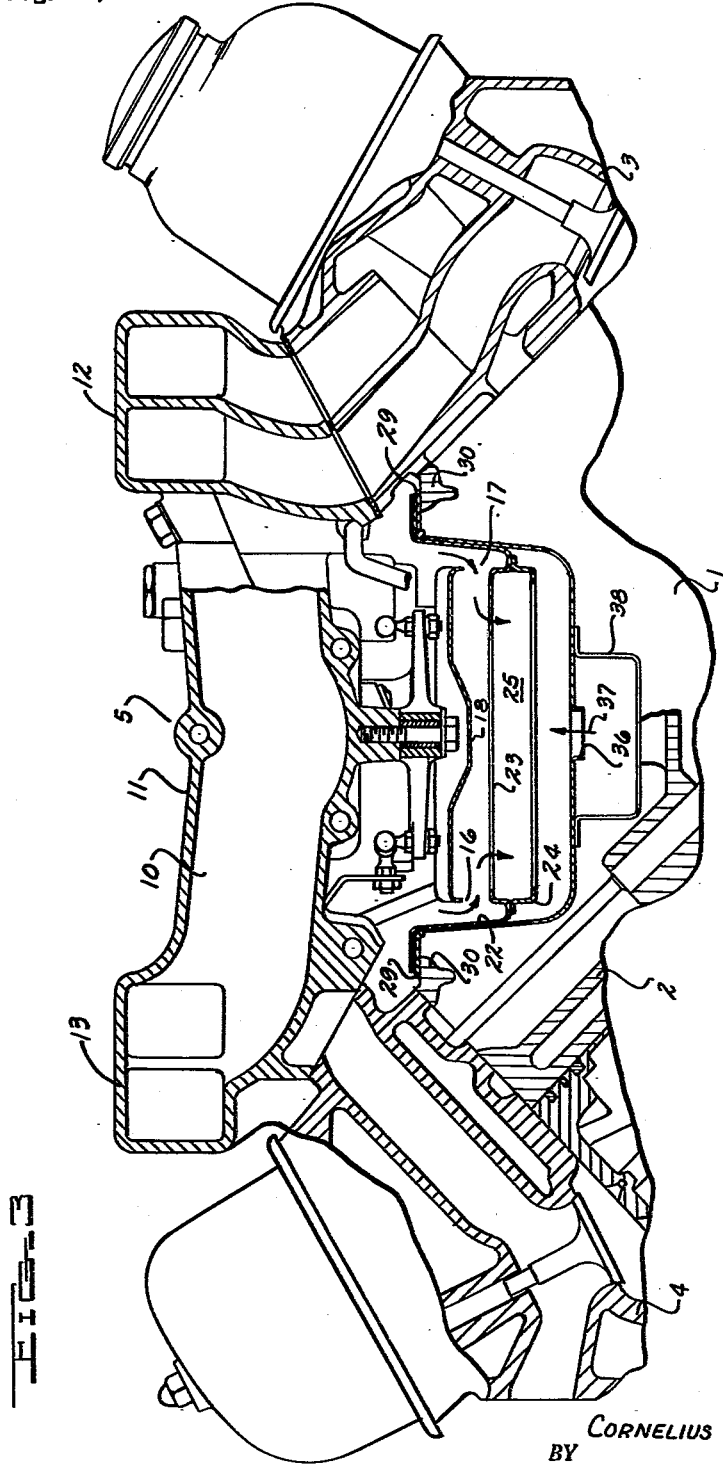

United States Patent Office 2,796,853
Patented June 25, 1957

2,796,853

AIR INLET ARRANGEMENT FOR COMBUSTION ENGINES

Cornelius W. Van Ranst, Dearborn, Mich.

Application August 26, 1955, Serial No. 530,729

17 Claims. (Cl. 123—55)

This invention relates to combustion engines and particularly to the construction and arrangement of the air inlet system, including the engine carburetor and the conduit means for directing air into said carburetor.

Present day combustion engines are usually provided with downdraft carburetors and rather large dimension air cleaners. The carburetor is usually perched above the inlet manifold of the engine, and the air cleaner in many cases is positioned directly above the carburetor. These parts therefore project a considerable distance above the top or upper limit of the engine. When the engine is employed in an automobile or boat the hood or deck thereof must be constructed so as to provide clearance for the air cleaner and carburetor. The designs of present day automobiles and various types of boats are such that the automobile hood or boat deck generally is made as low as possible, and accordingly it is desirable that the air cleaner and carburetor means not project above the upper limit of the engine. In the present invention the carburetor and air cleaner are positioned below the upper limit of the engine so as to permit use of the engine in low silhouette automobiles and boats.

In the case of boat engines a problem has arisen by reason of the fact that explosive fumes and gases are sometimes formed in or conveyed to the engine crankcase. Serious explosions have sometimes occurred from the presence of these fumes. It is desirable therefore that means be provided for drawing these explosive fumes from the engine crankcase. Under the present invention the engine carburetor is in communication with the carburetor air intake means. As a result any explosive fumes in the crankcase are drawn off into the carburetor during engine operation.

Another problem arises by reason of fuel leakage from the carburetor. Such fuel leakage presents a fire and explosion hazard which it is desirable to eliminate. The present invention provides a receptacle beneath the carburetor, and drain means leading therefrom for removal of any leaked fuel.

One object of the invention is to provide a power plant construction including a combustion engine, carburetor means and air cleaner means; wherein the carburetor means and air cleaner are positioned below the upper limit of the engine.

Another object is to provide a power plant construction including a combustion engine and carburetor means; wherein the carburetor air intake means is in communication with the engine crankcase whereby to draw off any explosive gases which may accumulate in said crankcase.

Another object is to provide a power plant construction including a combustion engine and carburetor means; wherein means is provided for safely removing any fuel which may leak from said carburetor means.

Another object is to provide a construction which achieves the above mentioned object, and at comparatively low cost.

Other objects of this invention will appear in the following description and appended claims, reference being had to the accompanying drawings forming a part of this specification wherein like reference characters designate corresponding parts in the several views.

In the drawings:

Figure 1 is a longitudinal sectional view taken through a combustion engine in which is incorporated one embodiment of the invention.

Fig. 2 is a perspective view of the Figure 1 mechanism with parts broken away for illustration purposes, and Fig. 3 is a sectional view taken on line 3—3 in Figure 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a V-type combustion engine 1 including a cylinder block 2 and cylinder heads 3 and 4. The construction and placement of block 2 and heads 3, 4 are such as to provide a V-shaped cavity 5. Within cavity 5 there are positioned two carburetors 6 and 7 having float chambers 8 and 9. Each of the carburetors is of the horizontal type wherein the air flows horizontally through a carburetor mixing tube. The fuel-air mixtures from carburetors 6 and 7 discharge into a conduit 10 in a casting 11. Casting 11 is formed integrally with inlet manifolds 12 and 13. Engine 1 is an eight cylinder engine, and each of manifolds 12 and 13 feeds four of the cylinders.

Air for carburetors 6 and 7 is initially taken in through four rectangular openings 14, 15, 16 and 17 formed in a sheet metal member 18. Member 18 includes a wall member 19 and four supporting leg members 20 (only two of which are shown in the drawings). Leg members 20 are secured on the bottom wall 21 of a pan shaped member 22. A rectangular opening 23 is formed in wall 21 and an endless frame element 24 is secured on the lower face of said wall around the opening. Frame 24 serves to mount air filtering material 25 within opening 23. Filter material 25 removes dust and dirt from the incoming air after it passes through opening 23.

In order to direct the air into the carburetors after it has passed through cleaner material 25 there is provided a pan 26 and two bell-shaped housings 27 and 28. Pan 26 has a peripheral flange 29 which rests on shoulders 30 formed integrally with cylinder block 2. Pan 26 directs air into housings 27 and 28, the air flow path being indicated generally by arrows 31.

Housings 27 and 28 include outlet passages 33 which communicate with the air intake passages of carburetors 6 and 7. It will be understood therefore that air is supplied to the carburetors via openings 14, 15, 16 and 17, air cleaner means 25, the space between pans 22 and 26, and housings 27, 28.

Due to the nesting of carburetor means 6, 7 within V-shaped cavity 5 and the placement of air cleaner 55 beneath the carburetors, neither the carburetor means or air cleaner projects above the upper limit of engine 1, and the power plant can be employed in very low silhouette automobiles and boats.

During operation of the engine explosive gases may collect in the engine crankcase 35. In order that these gases may not cause an explosion it is desirable that they be removed from the crankcase. Accordingly there is provided in pan 26 a number of openings 36. These openings communicate with crankcase 35, and during engine operation the explosive gases are drawn by carburetor suction through openings 36 in the direction of arrows 37. These gases are then drawn into the carburetors with the incoming air, and are ultimately discharged with the engine exhaust. A trough-shaped member 38 depends from pan 26 and serves to collect explosive gases from the front and rear ends of the engine crankcase. Oil and gas waste falls from the open ends of member 38.

Leakage of fuel from carburetors 6 and 7 presents a fire and explosion hazard which it is desired to eliminate. Accordingly, pan 22 is provided with a drain opening 39 and drain tube 40. Any fuel which may lead from carburetors 6 and 7 will fall into pan 22 and flow into tube 40. Wall 19 prevents any of the leaking fuel from falling onto air cleaner 25. Tube 40 may lead to a suitable receptacle remote from the engine. When engine 1 is employed as a marine engine tube 40 may lead to the water injection system (not shown) which is provided for cooling the exhaust gases. In such an event the leaking fuel will be removed with the engine exhaust gases.

Having thus described my invention, I claim:

1. The combination with a V-type combustion engine comprising carburetor means in the V-shaped cavity defined by the engine; wall means beneath said carburetor means; second wall means spaced below said first wall means; air cleaner means directly beneath said first wall means and mounted on said second wall means; and third wall means spaced beneath said second wall means and forming therewith conduit means for supplying air to the carburetor means; whereby air may be drawn between the first and second wall means, through the air cleaner means and into the conduit means.

2. The combination with a V-type combustion engine comprising carburetor means in the V-shaped cavity defined by the engine; wall means beneath said carburetor means; second wall means spaced below said first wall means; air cleaner means directly beneath said first wall means and mounted on said second wall means; and third wall means spaced beneath said second means and forming therewith conduit means for supplying air to the carburetor means, said second means having an opening formed therein and exposed to the crankcase; whereby air may be drawn between the first and second wall means, through the air cleaner means and into the conduit means, and gases in the crankcase may be drawn through the opening into the conduit means.

3. The combination with a V-type combustion engine comprising carburetor means in the V-shaped cavity defined by the engine; conduit means beneath the carburetor means for supplying said carburetor means with air; and second conduit means between the first conduit means and engine crankcase whereby gases in the crankcase may be drawn into the first conduit means.

4. The combination with a V-type combustion engine comprising carburetor means in the V-shaped cavity defined by the engine; conduit means beneath the carburetor means for supplying said carburetor means with air; air cleaner means in said conduit means; and conduit means between said first conduit means and the engine crankcase for allowing gases in the crankcase to be drawn into the first conduit means.

5. The combination with a V-type combustion engine comprising horizontal carburetor means in the V-shaped cavity defined by the engine; a pan-shaped member positioned beneath the carburetor means; a second pan-shaped member positioned within said first member; air cleaner means located in the bottom wall of the second member; horizontal wall means directly overlying said air cleaner means and spaced upwardly therefrom; an opening in said first pan-shaped member in communication with the engine crankcase; and conduit means interconnecting the space between the pan members with the carburetor air intake means.

6. The combination with a V-type combustion engine comprising carburetor means in the V-shaped cavity defined by the engine; a pan-shaped member positioned beneath the carburetor means; a second pan-shaped member positioned within said first member; air cleaner means located in the bottom wall of the second member; horizontal wall means directly overlying said air cleaner means and spaced upwardly therefrom; an opening in said first pan-shaped member in communication with the engine crankcase; and conduit means interconnecting the space between the pan members with the carburetor air intake means.

7. The combination with a V-type combustion engine comprising carburetor means in the V-shaped cavity defined by the engine; a pan-shaped member positioned beneath the carburetor means; a second pan-shaped member positioned within said first member; air cleaner means located in the bottom wall of the second member; an opening in said first pan-shaped member in communication with the engine crankcase; and conduit means interconnecting the space between the pan members with the carburetor air intake means.

8. The combination with a V-type combustion engine comprising carburetor means in the V-shaped cavity defined by the engine; a pan-shaped member positioned beneath the carburetor means; a second pan-shaped member positioned within said first member; air cleaner means located in the bottom wall of the second member; and conduit means interconnecting the space between the pan members with the carburetor air intake means.

9. The combination with a V-type combustion engine comprising horizontal carburetor means in the V-shaped cavity defined by the engine; a pan-shaped member positioned beneath the carburetor means; a second pan-shaped member positioned within said first member; air cleaner means located in the bottom wall of the second member; conduit means interconnecting the space between the pan members with the carburetor air intake means; and drain means leading from said second pan-shaped member for removal of any fuel which might leak from the carburetor means.

10. The combination with a V-type combustion engine comprising carburetor means in the V-shaped cavity defined by the engine; a pan-shaped member positioned beneath the carburetor means; a second pan-shaped member positioned within said first member; air cleaner means located in the bottom wall of the second member; conduit means interconnecting the space between the pan members with the carburetor air intake means; and drain means leading from said second pan-shaped member for removal of any fuel which might leak from the carburetor means.

11. The combination with a V-type combustion engine comprising carburetor means in the V-shaped cavity defined by the engine; a first wall spaced beneath said carburetor means; a second wall spaced beneath said first wall; air cleaner means in said second wall; an opening in said second wall and exposed to the engine crankcase; conduit means interconnecting the space between the first wall and second wall with the carburetor air intake means; and drain means leading from said first wall for removal of any fuel which might leak from the carburetor means.

12. The combination with a combustion engine comprising carburetor means; a first wall overlying the engine; air cleaner means in said first wall; a second wall spaced beneath said first wall; an opening in said second wall and exposed to the engine crankcase; and conduit means interconnecting the space between the two walls with the carburetor air intake means; whereby air may be drawn through the air cleaner means, into the space between the walls, and into the conduit means, and gases from the crankcase may be drawn through the opening into the space between the walls.

13. The combination with a combustion engine comprising carburetor means; a first wall overlying the engine; a second wall spaced beneath said first wall; an opening in said second wall and exposed to the engine crankcase; and conduit means interconnecting the space between the two walls with the carburetor air intake means; whereby air may be drawn into the space between the walls, and into the conduit means, and gases from the crankcase may be drawn through the opening into the space between the walls.

14. The combination with a combustion engine comprising carburetor means; a first wall overlying the engine; a second wall spaced beneath said first wall; and conduit means interconnecting the space between the two walls with the carburetor air intake means; whereby air may be drawn into the space between the walls, and into the conduit means.

15. The combination with a combustion engine comprising carburetor means; a first wall overlying the engine; air cleaner means in said first wall; a second wall spaced beneath said first wall; and conduit means interconnecting the space between the two walls with the carburetor air intake means; whereby air may be drawn through the air cleaner means, into the space between the walls, and into the conduit means.

16. The combination with a combustion engine comprising carburetor means overlying the engine; a pan-shaped member below said carburetor means and provided with an opening; a wall spaced below said pan-shaped member; conduit means interconnecting the space between the member and wall with the carburetor air intake means; and drain means leading from the pan-shaped member; whereby air may be drawn through the opening into the space between the member and wall, and into the conduit means.

17. The combination with a combustion engine comprising carburetor means therefor; wall means beneath the carburetor means and forming conduit means for supplying air to said carburetor means; an opening in said wall means and exposed to the engine crankcase; and longitudinally extending passage means in communication with said opening for collecting gases from the ends of the engine and directing them through the opening into the conduit means.

References Cited in the file of this patent

UNITED STATES PATENTS

| | | |
|---|---|---|
| 1,251,142 | Vincent | Dec. 25, 1917 |
| 1,365,564 | Strickland | Jan. 11, 1921 |
| 1,874,401 | Williams | Aug. 30, 1932 |
| 1,897,783 | Anibal | Feb. 14, 1933 |
| 1,905,258 | Williams | Apr. 25, 1933 |